United States Patent
Jayaraman

(10) Patent No.: US 10,776,138 B1
(45) Date of Patent: Sep. 15, 2020

(54) RECIPIENT-SIDE DYNAMIC CUSTOMIZATION OF AN EMAIL INTENDED FOR THE RECIPIENT

(71) Applicant: Capital One Services, LLC, McLean, VA (US)

(72) Inventor: Kamalesh Jayaraman, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/664,573

(22) Filed: Oct. 25, 2019

(51) Int. Cl.
 *G06F 9/54* (2006.01)
 *G06F 16/2455* (2019.01)
 *H04L 12/58* (2006.01)
 *H04L 29/08* (2006.01)
 *G06F 9/451* (2018.01)

(52) U.S. Cl.
 CPC .............. *G06F 9/451* (2018.02); *G06F 9/541* (2013.01); *G06F 16/2455* (2019.01); *H04L 51/22* (2013.01); *H04L 67/22* (2013.01); *H04L 67/02* (2013.01)

(58) Field of Classification Search
 CPC ...... G06F 9/451; G06F 9/541; G06F 16/2455; H04L 51/22; H04L 67/02; H04L 67/22
 See application file for complete search history.

(56) References Cited

U.S. PATENT DOCUMENTS

| 7,707,317 | B2 * | 4/2010 | Huynh | H04L 29/06 |
| | | | | 709/206 |
| 8,032,596 | B2 * | 10/2011 | Sivakumar | H04L 1/0006 |
| | | | | 709/206 |
| 9,363,311 | B1 * | 6/2016 | McWilliams | H04L 67/42 |
| 10,044,650 | B1 * | 8/2018 | Gupta | H04L 51/063 |
| 2002/0120600 | A1 * | 8/2002 | Schiavone | H04L 51/12 |
| 2005/0193071 | A1 | 9/2005 | Hollatz et al. | |
| 2011/0219115 | A1 | 9/2011 | Capel et al. | |
| 2015/0347925 | A1 | 12/2015 | Zeng et al. | |
| 2017/0078232 | A1 * | 3/2017 | Faruk | H04L 67/02 |
| 2018/0026926 | A1 | 1/2018 | Nigam et al. | |
| 2018/0048595 | A1 * | 2/2018 | Dotan-Cohen | H04L 51/20 |
| 2018/0219818 | A1 | 8/2018 | Kramer et al. | |

OTHER PUBLICATIONS

Chowdhry, Amit, "Intelligent Content: The Final Frontier For Digital Marketers," https://www.forbes.com/sites/amitchowdhry, Mar. 21, 2018 (6 pages).
Office Action issued in U.S. Appl. No. 16/664,560 dated Jan. 13, 2020 (22 pages).

* cited by examiner

*Primary Examiner* — Shourjo Dasgupta
(74) *Attorney, Agent, or Firm* — Pillsbury Winthrop Shaw Pittman LLP

(57) ABSTRACT

In certain embodiments, a client device may obtain an email including a plurality of components. Responsive to an action to open the email, the client device may obtain user data associated with a user. The client device may determine a subset of components of the plurality of components of the email to be displayed in a customized email based on the user data. The subset of components may be caused to be displayed in the customized email via a user interface without displaying one or more other components of the plurality of components in the customized email.

17 Claims, 5 Drawing Sheets

RECIPIENT-SIDE DYNAMIC CUSTOMIZATION OF AN EMAIL INTENDED FOR THE RECIPIENT

FIELD OF THE INVENTION

The invention relates to customizing a correspondence, for example, dynamically customizing an email, after dispatch of the correspondence to an intended recipient and in response to an action to view the correspondence by the intended recipient.

BACKGROUND OF THE INVENTION

Correspondences are exchanged between users and such correspondences are intended to provide information relevant to an intended recipient user. However, a recipient user may not always read the entire correspondence, the content within the correspondence may not always be relevant to the intended recipient user, and the recipient user may not positively engage with the content in the correspondence. This may be especially true in the case of sending bulk correspondences to multiple recipient users. These and other drawbacks exist.

SUMMARY OF THE INVENTION

Aspects of the invention relate to methods, apparatuses, and/or systems for facilitating dynamic customization of an email correspondence after dispatch of the email correspondence to an intended recipient and, for example, in response to an action to view the email correspondence by the intended recipient.

One aspect of the disclosure relates to a system comprising a client device that comprises one or more processors programmed with computer program instructions that, when executed, cause the client device to obtain an email including a plurality of components, responsive to an action to open the email, obtain user data associated with a user, determining a subset of components of the plurality of components of the email to be displayed in a customized email based on the user data, and cause the subset of components to be displayed in the customized email via a user interface without displaying one or more other components of the plurality of components in the customized email.

Another aspect of the disclosure relates to a method comprising obtaining, by a client device, an email including a plurality of components, responsive to an action to open the email, obtaining, by the client device, user data associated with a user, determining, by the client device, a subset of components of the plurality of components of the email to be displayed in a customized email based on the user data, and causing the subset of components to be displayed in the customized email via a user interface without displaying one or more other components of the plurality of components in the customized email.

Another aspect of the disclosure relates to one or more non-transitory, computer-readable media storing instructions that, when executed by one or more processors, effectuate operations comprising obtaining, by a client device, an email including a plurality of components, responsive to an action to open the email, obtaining, by the client device, user data associated with a user, determining, by the client device, a subset of components of the plurality of components of the email to be displayed in a customized email based on the user data, and causing the subset of components to be displayed in the customized email via a user interface without displaying one or more other components of the plurality of components in the customized email.

Another aspect of the disclosure relates to a system for customization of an email at a client device, the system comprising a computer system that comprises one or more processors programmed with computer program instructions that, when executed, cause the computer system to send, to a client device, an email including a plurality of components, receive an application programming interface (API) request for email activity data associated with a user from the client device, the API request being received from the client device responsive to an action to open the email at the client device, and responsive to the API request, send the email activity data to the client device via a network connection, wherein the email activity data causes the client device to select a subset of components of the plurality of components of the email to be displayed in a customized email based on the email activity data such that the subset of components is displayed in the customized email without one or more other components of the plurality of components being displayed in the customized email.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
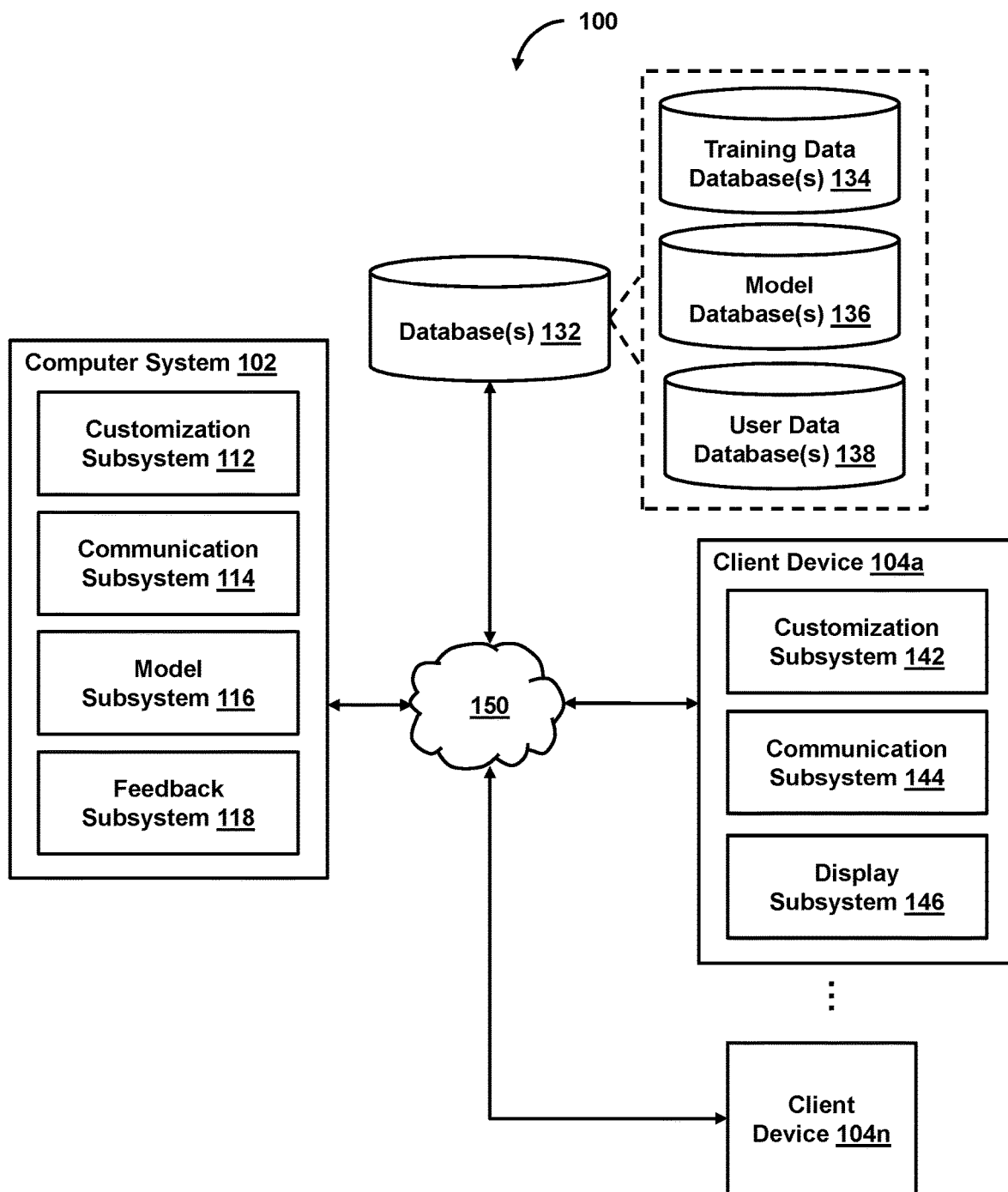
FIG. 1 shows a system for facilitating customization of a correspondence, in accordance with one or more embodiments.

FIG. 1 shows a system 100 for facilitating customization of a correspondence (for example, an email, SMS, voice mail transcription, social media, messaging applications, or other correspondences that may be exchanged between users), in accordance with one or more embodiments. As shown in FIG. 1, system 100 may include computer system 102, client device 104 (or client devices 104a-104n), or other components. Computer system 102 may include customization subsystem 112, communication subsystem 114, model subsystem 116, feedback subsystem 118, or other components. Client device 104 may include customization subsystem 142, communication subsystem 144, display subsystem 146, or other components. Each client device 104 may include any type of mobile terminal, fixed terminal, or other device. By way of example, client device 104 may include a desktop computer, a notebook computer, a tablet computer, a smartphone, a wearable device, a device on the cloud, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104 or other components of system 100 and while one or more operations are described herein as being performed by components of client device 104, those operations may, in some embodiments, be performed by components of computer system 102 or other components of system 100. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Customization of a Correspondence Prior to Dispatch of the Correspondence to a User In some embodiments, system 100 may facilitate customization of a correspondence (for example, an email, SMS, voice mail transcription, social media correspondence, messaging applications, etc.) prior to dispatch of the correspondence to a user (for example, an intended recipient of the correspondence). In some embodiments, the customization of a correspondence may be based on data associated with a user. Although the description below may refer to an email correspondence, it should be understood that the details of the disclosure may apply to any type of correspondence.

In some embodiments, system 100 may facilitate customization of an email based on user data (for example, email activity data, user activity data, or website activity data). The computer system 102 may obtain an email, for example, from a client device 104 or an external source (not illustrated). For example, the email may be obtained by the computer system 102 from a sender who intends the email to be received by multiple users. In other words, the obtained email may be intended for a plurality of users (for example, a plurality of intended recipients). The obtained email may include a plurality of components or portions. The plurality of components or portions of an email may include a header, footer, signature block, subject, body, image, or other components of an email. It should be understood that each of those header, footer, signature block, subject, body, and image may also include a plurality of components or portions. For example, the body of the email may include a plurality of words, sentences, or paragraphs, and the plurality of words, sentences, or paragraphs of the body may be considered as plurality of components or portions of an email.

In some embodiments, the computer system 102 may obtain user data associated with one or more users from the user data database 138, for example, via an application programming interface (API) request. The user data associated with the activities of one or more users may be periodically collected and stored in the user data database 138 so as to allow the computer system 102 to access such user data when needed. For example, a company may collect user data associated with each of its employees and store it in a database and use such user data when needed. In some embodiments, the obtained user data may include user data associated a specific time period. For example, the obtained user data may include user data associated with a time stamp within the past year, within the past two years, within the past few months, etc. The time stamp may correspond to a time at which the user data was collected and stored in the user data database 138. Since user habits change over time, some user data (for example, older user data) may not be relevant anymore. Accordingly, only relevant user data may be obtained or used. The relevance of the user data may be determined (for example, by the computer system 102 or a client device 104) by comparing the newer user data with the older user data and determining whether there are any differences between the older user data and the newer user data that exceed a predetermined threshold. If such a threshold is exceeded, then the older user data may be deleted from the user data database 138 and the newer user data may be obtained (or used for customizing an email). This way, user data that is not relevant may not need to be communicated or used. For example, older user data may indicate that a user spends an average (or total) time of less than five seconds looking at an email, while the newer user data may indicate that the same user now spends an average (or total) time of thirty seconds looking at an email. This would suggest that the user habit has changed in recent times and therefore, older user data may no longer be relevant. Accordingly, only relevant user data may be obtained or used.

In some embodiments, the user data associated with a user may include email activity data associated with the user's previous activity with emails. The email activity data may include data regarding the user's time (for example, average amount of time, total amount of time, etc.) of interaction with one or more emails, the user's amount of scrolls (for example, average amount of scrolls, total amount of scrolls, etc.) through one or more emails, or the user's interaction with links within one or more emails. The email activity data may be tracked by using content inserted into the email, like a hyperlink, tracking code, etc. that includes a tracking pixel. A tracking pixel may be a 1×1 pixel (or larger) or a pixel tag that is loaded when a document or an email is opened or when a hyperlink is accessed. Or embodiments may use a tracking font, a tracking script, or various other remote resources called when rendering by a rendering engine. The tracking pixel may be associated with a URL that corresponds to a memory location on a server (for example, computer system 102). When a document, email, or hyperlink that has a tracking pixel is opened, the opening application may parse the document (or email or hyperlink), detect the URL, and respond by triggering a request to a web server where the tracking pixel is hosted. The server may then send a pixel tag to an IP address (from which the document, email, or hyperlink was opened or accessed) and that IP address may be logged by the web server (for example, computer system 102). In addition to the IP address, various other information associated with, for example, a user that opened or otherwise accessed the document, email, or hyperlink may be obtained. Such other information may include an operating system used, types of website or email used, type of client used, screen resolution, time the document (or email or hyperlink) was read or otherwise accessed, interaction with links within a document or email, and activities on the website during a session. In some embodiments, the user scrolls may also be tracked based on a user's action and a location of a call to action button/link.

In some embodiments, the email activity data associated with a user may be collected from a user each time the user accesses his/her email. For example, a company that monitors activities of its employees may collect email activity data associated with each user. The email activity data for each user may be stored in the user data database 138 along with a time stamp (for example, the time associated with the user's activity with an email). As user habits and activities change over time, certain email activity data may not be as relevant as other email activity data (for example, email activity data that are more recent may be more relevant to the user than older email activity data). Accordingly, in some embodiments, the email activity data may be associated with weights and the weights associated with the email activity data may be based on relevance of the email activity data (for example, email activity data that are more recent may be more relevant to the user than older email activity data). The weights associated with the email activity data may be periodically or dynamically modified based on a change in relevance of the email activity data. For example, a weight associated with email activity data at a current time may be higher that the weight associated with the same email activity data one year after the current time.

In some embodiments, the computer system 102 (for example, the customization subsystem 112) may determine a subset of components of the plurality of components of the email to be included in a customized email based on the email activity data such that the customized email includes the subset of components and excludes one or more other components of the plurality of components of the email. In other words, the customization subsystem 112 may customize an email instance of the email for a user based on email activity data such that the email instance includes a subset of components of the plurality of components and excludes one or more other components of the plurality of components. Alternatively, or additionally, the customization of the email may also be performed such that the customized email includes one or more components that are highlighted, that are capitalized, or that are formatted (for example, modifying the font, paragraph spacing, etc.) and other components of the customized email that are not highlighted, capitalized, or formatted. In other words, a customized email may include one or more components that are selected to be highlighted, capitalized, or formatted and may include other components that are not highlighted, capitalized, or formatted. Alternatively, or additionally, each of the components included in the customized email may be highlighted, capitalized, or formatted (for example, modifying the font, paragraph spacing, etc.), while one or more other components of the email are excluded from the customized email. Alternatively, or additionally, one or more components included in the customized email may be highlighted, capitalized, or formatted (for example, modifying the font, paragraph spacing, etc.), while a first subset of other components of the email are excluded from the customized email and while a second subset of the other components of the email are included in the customized email but not highlighted, capitalized, or formatted. In other words, a customized email may include one or more components of the email that are highlighted, capitalized, or formatted and may include a first subset of other components of the email that are not highlighted, capitalized, or formatted, while a second subset of the other components of the email are excluded from the customized email. Such customization may be based on user data (for example, email activity data, user activity data, or web site activity data).

In some embodiments, the customization of an email may be based on a portion of the obtained user data (for example, a portion of the obtained email activity data, user activity data, or website activity data). The computer system 102 (for example, the customization subsystem 112) may determine a portion of the user data that is relevant to the user and other portions of the user data that are not relevant to the user and utilize the relevant portion of the user data to determine a subset of components of the plurality of components of the email to be included in a customized email such that the customized email includes the subset of components and excludes one or more other components of the plurality of components of the email. As discussed above, the relevant portion of the user data may be determined based on differences between the newer user data and the older user data. For example, older user data may indicate that a user spends an average (or total) time of less than five seconds looking at an email, while the newer user data may indicate that the same user now spends an average (or total) time of thirty seconds looking at an email. If a threshold for a difference between older user data and newer user data is five seconds, then the computer system 102 may determine that the newer user data (for example, indicating that the user now spends an average (or total) time of thirty seconds looking at an email) may be more relevant and that the newer user data should be utilized, while excluding the older user data from being utilized. Accordingly, the computer system 102 may utilize a portion of the obtained user data (for example, a portion of the user data that is relevant to the user) to determine a subset of components of the plurality of components of the email to be included in a customized email such that the customized email includes the subset of components and excludes one or more other components of the plurality of components of the email.

Alternatively, or additionally, the computer system 102 may obtain a subset of the user data (including a subset of the newer user data and a subset of the older user data) from the user data database 138 and may determine whether the older user data is relevant or not based on a comparison of the subset of the newer user data and the subset of the older user data. If the computer system 102 determines that difference between the subset of the new user data and the subset of the older user data exceeds a predetermined threshold, then the computer system 102 may only obtain the rest of the newer user data to utilize the newer user data to determine a subset of components of the plurality of components of the email to be included in a customized email such that the customized email includes the subset of components and excludes one or more other components of the plurality of components of the email. Accordingly, only relevant user data may be obtained or used.

In some embodiments, the customization of the email may be performed prior to dispatch of the customized email to a user. As an example, the email activity data may indicate that the user only spends a total (or average) of less than seven seconds looking at an email. Based on such email activity data, the customization subsystem 112 may determine that a customized email should only include, for example, the subject and a first paragraph of the body of the email, and that other components of the email (for example, header, footer, other paragraphs of the body of the email, image, etc.) should be excluded.

Additionally, in some embodiments, the customization subsystem 112 may also take into account the weights associated with different pieces of data in the email activity data and may determine a subset of components of the plurality of components of the email to be included in a customized email based on the email activity data and the weights associated with the email activity data. As an example, a higher weight may be assigned to email activity data associated with the past year compared to email activity associated with dates prior to the past year (that is, email activity data indicating that a user spends a total (or average) of fifteen seconds looking at one or more emails in the past year may be assigned a higher weight than email activity data that indicates that the user spent a total (or average) less than five seconds looking at one or more email prior to the past year). Based on such email activity data and weights associated with the email activity data, the customization subsystem 112 may determine that a customized email should include, for example, the subject, the header, the first two paragraphs in the body of the email, and the image, and that other components of the email (for example, footer, other paragraphs in the body of the email, etc.) should be excluded.

As another example, the email activity data may indicate that the user interacts often with links within emails. Based on such data associated with the email activity data, the customization subsystem 112 may determine that a customized email should include, for example, the subject, the header, and any paragraph in the body of the email that includes a link, and that other components of the email (for example, footer, other paragraphs in the body of the email, image, etc.) should be excluded. Additionally, the customization subsystem 112 may take into account weights associated with user's interaction with links within emails and based on this, may determine a subset of components of the plurality of components of the email to be included in a customized email and one or more other components to be excluded from the customized email.

In some embodiments, the customization subsystem 112 may customize an email such that one or more portions of one or more components of the email are included in the customized email and the other portions of the one or more components or the other components (other than the one or more components) of the email are excluded from the customized email. As an example, the email activity data may indicate that a user spends a total (or average) time of less than three seconds on an email. Based on such email activity data, the customization subsystem 112 may determine that a customized email should only include, for example, a portion of the subject and a portion of the first paragraph of the body of the email, and that other components of the email (for example, header, footer, other portion of the subject, other paragraphs of the body of the email, other portions of the first paragraph, image, etc.) should be excluded.

In some embodiments, the computer system 102 may send the customized email to a user (for example, to a client device 104 associated with the user or to a device on the cloud that receives and stores the email associated with a user's email account). The user can access the customized email by accessing his or her email account via, for example, a client device 104. As illustrated in FIG. 1, the computer system 102 may communicate with the client device 104 via a network 150.

In some embodiments, the obtained user data may include user activity data. The user activity data may be associated with the user's previous activity related to the contents of the obtained email. In some embodiments, computer system 102 (for example, the customization subsystem 112) may scan the contents of the obtained email. Based on scanning the email, the customization subsystem 112 may identify the contents associated with the email. In some embodiments, the computer system 102 may generate a request (for example, an API request) to obtain user activity data, which includes data associated with the user's activity related to the contents of the email. The request may be generated based on the scanned contents of the email and an identity of the user associated with the email.

In some embodiments, user activity data may be stored in a user data database 138. User activity data may correspond to a user's activity. For example, if a user has an account with a bank, the user activity data associated with the user may include data indicating dates and times of withdrawal, amount of withdrawals, dates and times of deposit, amount of deposits, and other data of the user's activity connected to the bank account associated with the user. Further, if a user has a credit card account with a bank, the user activity data associated with the user may include data indicating date and time of previous payment, amount of previous payment, date and time of next payment, amount of next payment, and other data of the user's activity connected to the credit card account associated with the user. Although the above examples relate to a user's bank account and credit card account, it should be understood that user activity data may include any data associated with a user's activity. The user activity data may be collected by the computer system 102 each time a user takes an action, for example, with his/her bank account or credit card account and the user activity data may be stored (along with a user's identification) in the user data database 138.

In some embodiments, in response to a request for user activity data related to the contents of the email, the computer system 102 may retrieve user activity data related to the contents of the email. In other words, if the request for user activity data is related to a user's credit card account, then the computer system 102 may retrieve user activity data related to the user's credit card account. As an example, an email may include contents associated with a credit card account and a plurality of components of the email may include "Your next payment is due soon" and "Thank you for your payment." Based on such contents of the email and based on scanning of the email, the computer system 102 may determine that the contents of the email to correspond to a credit card account. Accordingly, the computer system 102 may request to retrieve a user's activity data associated with the user's credit card account. If the obtained user activity data indicates that the user recently made a credit card payment, then the customization subsystem 112 may determine a subset of components (for example, "Thank you for your payment") to be included in a customized email based on the user activity data (for example, an indication that the user recently made a credit card payment) such that the customized email includes the subset of components (for example, "Thank you for your payment") and excludes the other components (for example, "Your next payment is due soon") of the email. In other words, the customization subsystem 112 may customize an email instance of the email for a user based on user activity data such that the email instance includes a subset of components of the plurality of components and excludes other components of the plurality of components. As noted above, customization of an email may be done prior to dispatch of the customized email to a user (for example, to a client device 104 or to a device in a cloud that stores emails).

In some embodiments, the customization subsystem 112 may customize an email such that one or more portions of one or more components of the email are included in the customized email and the other portions of the one or more components or the other components (other than the one or more components) of the email are excluded from the customized email. As an example, an email may include contents associated with a credit card account and a plurality of components of the email may include "Your next payment is due soon" and "Payment received, thank you for your payment." Based on such contents of the email and based on scanning of the email, the computer system 102 may determine that the contents of the email to correspond to a credit card account. Accordingly, the computer system 102 may request to retrieve a user's activity data associated with the user's credit card account. If the obtained user activity data indicates that the user recently made a credit card payment, then the customization subsystem 112 may determine one or more portions of a component (for example, "Payment received") to be included in a customized email based on the user activity data (for example, an indication that the user recently made a credit card payment) such that the customized email includes a portion of a component (for example, "Payment received") and excludes other portions and other components (for example, "Your next payment is due soon" and ", thank you for your payment") of the email.

In some embodiments, the computer system 102 may send the customized email to a user (for example, to a client device 104 associated with the user or to a device on the cloud that receives and stores the email associated with the user). The user can access the customized email by accessing his or her email account via, for example, a client device 104. As illustrated in FIG. 1, the computer system 102 may communicate with the client device 104 via a network 150.

In some embodiments, the obtained user data may further include website activity data. The web site activity data may include data regarding a user's interaction with one or more websites. Website activity data may include data identifying the content of one or more websites visited by the user, the user's time (for example, average amount of time, total amount of time, etc.) of interaction with one or more websites, the user's amount of scrolls (for example, average amount of scrolls, total amount of scrolls, etc.) through one or more websites, the user's interaction with links within one or more websites, the user's number of visits associated with one or more websites, the user's percentage of new sessions associated with one or more websites, the user's use of channels (for example, direct, organic search, referral, email, paid search, other advertising) to access one or more websites, whether the user's visit to one or more websites was a single page visit, the user's conversion (for example, email subscriptions, contact form submissions, content downloads, engaging in live chat, watching videos, etc.) associated with one or more websites, a number of pages visited in one or more websites, whether the user visited one or more websites from a mobile device, or the user's landing and exit pages associated with one or more websites.

The website activity data of a user may be obtained periodically (for example, by the computer system 102). For example, an employee of the company may be tracked periodically, and the website activity data of the employee may be stored in, for example, the user data database 138. When website activity data is needed to customize an email, the computer system 102 may obtain the website activity data from the user data database 138 via an API request. The website activity data may be stored in the user data database 138 along with a time stamp (for example, the time associated with the user's website activity). As user habits and activities change over time, certain website activity data may not be as relevant as other website activity data (for example, website activity data that are more recent may be more relevant to the user than older website activity data). Accordingly, in some embodiments, the website activity data may be associated with weights and the weights associated with the website activity data may be based on relevance of the website activity data (for example, website activity data that are more recent may be more relevant to the user than older web site activity data). The weights associated with the website activity data may be periodically or dynamically modified based on a change in relevance of the website activity data. For example, a weight associated with website activity data at a current time may be higher that the weight associated with the same website activity data one year after the current time.

In some embodiments, the computer system 102 (for example, the customization subsystem 112) may determine a subset of components of the plurality of components of the email to be included in a customized email based on the website activity data such that the customized email includes the subset of components and excludes one or more other components of the plurality of components of the email. In other words, the customization subsystem 112 may customize an email instance of the email for a user based on website activity data such that the email instance includes a subset of components of the plurality of components and excludes one or more other components of the plurality of components. The customization of the email may be performed prior to dispatch of the customized email to a user. As an example, the web site activity data may indicate that the user only spends a total (or average) of less than seven seconds looking at one or more websites. Based on such website activity data, the customization subsystem 112 may determine that a customized email should only include, for example, the subject and a first paragraph of the body of the email, and that other components of the email (for example, header, footer, other paragraphs of the body of the email, image, etc.) should be excluded. Additionally, the customization subsystem 112 may also take into account the weights associated with different pieces of data in the website activity data and may determine a subset of components of the plurality of components of the email to be included in a customized email based on the website activity data and the weights associated with the website activity data. As an example, a higher weight may be assigned to website activity data associated with the past year compared to website activity associated with dates prior to the past year (that is, website activity data indicating that a user spends a total (or average) of fifteen seconds looking at one or more websites in the past year may be assigned a higher weight than website activity data that indicates that the user spent a total (or average) less than five seconds looking at one or more websites prior to the past year). Based on such website activity data and weights associated with the web site activity data, the customization subsystem 112 may determine that a customized email should include, for example, the subject, the header, the first two paragraphs in the body of the email, and the image, and that other components of the email (for example, footer, other paragraphs in the body of the email, etc.) should be excluded.

As another example, the website activity data may indicate specific content that the user views on one or more websites. For instance, website data activity may indicate that 40% of the websites that the user views are sports related, 25% of the websites are news related, 25% of the websites are related to stock trading, and 10% are miscellaneous or may indicate that a user spends a total (or average) time of two minutes on sports related websites and spends a total (or average) time of thirty seconds on news related websites. Based on such website activity data, the computer system 102 (for example, the customization subsystem 112) may customize an email such that the customized email includes the subject and all the paragraphs of the body of the email and excludes other components such as header and footer of the email when the contents of the email are sports related. On the other hand, based on such website activity data, the computer system 102 (for example, the customization subsystem 112) may customize an email such that the customized email includes the subject and a first paragraph of the body of the email and excludes other components such as header, footer, and other paragraphs of the body of the email when the contents of the email are news related. Additionally, the customization subsystem 112 may take into account weights associated with user's website activity and based on the weights, may determine a subset of components of the plurality of components of the email to be included in a customized email and one or more other components to be excluded from the customized email.

In some embodiments, the customization subsystem 112 may customize an email such that one or more portions of one or more components of the email are included in the customized email and the other portions of the one or more components or the other components (other than the one or more components) of the email are excluded from the customized email. As an example, the website activity data may indicate that a user spends a total (or average) time of ten seconds on sports related web sites and spends a total (or average) time of twenty seconds on news related websites. If the content of an email is sports related, then based on such website activity data, the customization subsystem 112 may determine that a customized email should include a portion of the subject and a portion of the first paragraph of the body of the email and should exclude other components of the email (for example, the other portion of the subject, the other portion of the first paragraph of the body of the email, the header, footer, image, etc.). If the content of the email is news related, then based on such website activity data, the customization subsystem 112 may determine that a customized email should include a portion of the subject and a portion of the first and second paragraphs of the body of the email and should exclude other components of the email (for example, the other portion of the subject, the other portions of the first and second paragraphs of the body of the email, the header, footer, image, etc.).

In some embodiments, the computer system 102 may send the customized email to a user (for example, to a client device 104 associated with the user or to a device on the cloud that receives and stores the email associated with the user). The user can access the customized email by accessing his or her email account on, for example, a client device 104. As illustrated in FIG. 1, the computer system 102 may communicate with the client device 104 via a network 150. The computer system 102 communicates with other devices or databases via, for example, the communication subsystem 114. Although certain examples are provided above to customize an email based on user data, it should be understood that the customization of an email may be based on one or more pieces of data of the user data.

Customizing an email based on the above techniques can be advantageous for several reasons. As an example, an intended recipient may receive content in the customized email that the intended recipient is likely to read. As another example, based on the above description, the intended recipient is more likely to receive content in the customized email that is relevant to the recipient user. As a further example, the recipient user may be more likely to positively engage (for example, via email subscriptions, via clicking on links included in the customized email, via contact form submissions, via content downloads, via engaging in live chat, via watching videos, etc.) with the content received in the customized email.

In some embodiments, system 100 (for example, via model subsystem 116 and feedback subsystem 118) may train or configure a prediction model to facilitate customization of an email. In some embodiments, system 100 may obtain user data (for example, email activity data, user activity data, or website activity data) and provide such user data as input to a prediction model to generate predictions (for example, related to how to customize an email and whether to customize an email). As an example, the obtained user data may include email activity data including data associated with a user's previous activity with one or more emails, user activity data including data associated with a user's activity related to contents of an email, and website activity data including data regarding the user's interaction with one or more websites. System 100 may provide information regarding customized emails as reference feedback to the prediction model, and the prediction model may update one or more portions of the prediction model based on the predictions and information regarding customized emails. As an example, the information regarding customized emails may be related to the customization of emails (e.g., information indicating how the customization of an email should be performed, information indicating whether the customization of an email was successful in conveying the message in the email to the user, etc.). In this way, for example, the prediction model may be trained or configured to generate more accurate predictions.

In some embodiments, subsequent to the updating of the prediction model, system 100 may use the prediction model to customize an email. As an example, system 100 may obtain and provide user data (for example, email activity data, user activity data, and website activity data) to the prediction model to obtain one or more predictions from the prediction model. System 100 may use the predictions to determine how to perform the customization of an email or to generate other determinations. In one use case, the prediction model may generate a prediction specifying what components of an email should be included in a customized email and what components of the email should be excluded from the customized email. In another use case, the prediction model may generate a prediction specifying a probability that including of certain components of an email and excluding other components of an email in a customized email will produce a satisfiable result (for example, a probability that the user will positively interact with a customized email). Each prediction model may be specific to a single user or multiple users.

In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free flowing, with connections interacting in a more chaotic and complex fashion.

In some embodiments, a collection of user data associated with a user (for example, email activity data with respect to 50 or more emails, 100 or more emails, 500 or more emails, 1,000 or more emails, 10,000 or more emails, 100,000 or more emails, 1,000,000 or more emails, etc., user activity data with respect to 50 or more user activities, 100 or more user activities, 500 or more user activities, 1,000 or more user activities, 10,000 or more user activities, 100,000 or more user activities, 1,000,000 or more user activities, etc., or website activity data with respect to 50 or more websites, 100 or more websites, 500 or more websites, 1,000 or more websites, 10,000 or more websites, 100,000 or more websites, 1,000,000 or more websites, etc.) may be obtained and provided to the prediction model via the model subsystem 116 to configure or train the prediction model. Feedback subsystem 118 may provide information regarding customization of emails as reference feedback to the prediction model, and the prediction model may update its configurations (for example, weights, biases, or other parameters) based on the predictions and the information regarding customization of emails. In some embodiments, feedback subsystem 118 may provide the information regarding customization of emails as reference feedback to the prediction model to cause the prediction model to assess its predictions against the information regarding customization of emails. As an example, the prediction model may update its configurations (for example, weights, biases, or other parameters) based on its assessment of the predictions. As an example, the predictions generated by the prediction model (e.g., based on the user data) may include predictions related to how to customize an email for a user or other predictions. The information regarding customization of emails may include information indicating how to customize an email (for example, what components of an email to include in the customized email and what components of the email to exclude from the customized email) and whether the customization of an email was successful in conveying the message in the email to the user (for example, whether the user positively interacted with the customized email).

In some embodiments, subsequent to the updating of the prediction model, the prediction model may be used to customize an email. As an example, user data may be obtained and provided to the prediction model to obtain one or more predictions from the prediction model. The predictions obtained from the prediction model may be used to determine how to customize an email (for example, what components of an email to include in the customized email and what components of the email to exclude from the customized email) and whether the customization of an email was successful in conveying the message in the email to the user (for example, whether the user positively interacted with the customized email). As an example, the predictions may include a prediction specifying how to customize an email (for example, to include subject and first paragraph of the body of the email in a customized email and to exclude the header, footer, image, and other paragraphs of the body of the email from the customized email), a prediction specifying a probability of success (for example, "X % Likelihood that user will interact with the customized email."). The training data database 134 may include training data (for example, user data and information regarding customization of emails) and model database 136 may include one or more trained prediction models.

Figure 2:
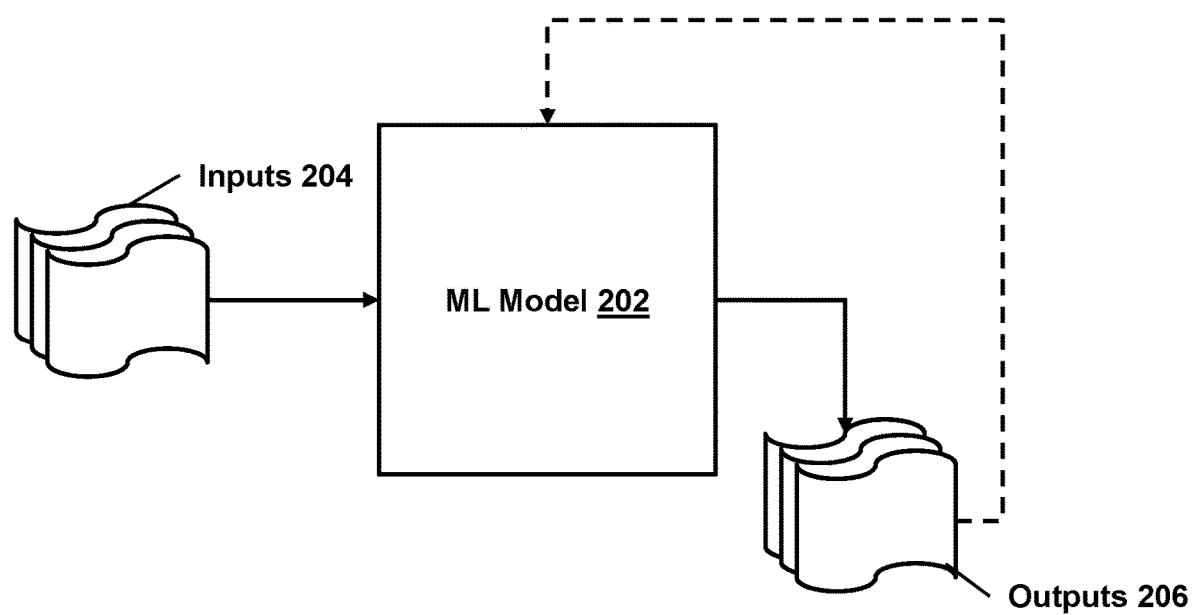
FIG. 2 shows a machine learning model configured to facilitate customization of a correspondence, in accordance with one or more embodiments.

As an example, with respect to FIG. 2, machine learning model 202 may take inputs 204 and provide outputs 206. In one use case, outputs 206 may be fed back (for example, active feedback) to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Customization of a Correspondence after Dispatch of the Correspondence to a User In some embodiments, system 100 may facilitate customization of a correspondence (for example, an email, SMS, voice mail transcription, social media correspondence, messaging applications, etc.) after the correspondence has been dispatched to a user (for example, an intended recipient of the correspondence). In other words, the customization of a correspondence may be performed after a sender has sent his/her correspondence to one or more users and the one or more users has received such a correspondence at a client device 104 or at a device in the cloud associated with a user account. In some embodiments, the customization of a correspondence may be based on data associated with a user. Although the description below may refer to an email correspondence, it should be understood that the details of the disclosure may apply to any type of correspondence.

In some embodiments, system 100 may facilitate customization of an email based on user data (for example, email activity data, user activity data, or website activity data). A client device 104 (for example, via communication subsystem 144) may obtain an email, for example, from the computer system 102 or an external source (not illustrated). For example, the email may be obtained by the client device 104 from a sender who intends the email to be received by multiple users. In other words, the obtained email may be intended for a plurality of users (for example, a plurality of intended recipients). It should be understood that the client device 104 may correspond to a device associated with a user or a device on the cloud that receives the email, which can be accessed via any other device. The obtained email may include a plurality of components or portions. The plurality of components or portions of an email may include a header, footer, signature block, subject, body, image, or other components of an email. It should be understood that each of header, footer, signature block, subject, body, and image may also include a plurality of components or portions. For example, the body of the email may include a plurality of words, sentences, or paragraphs, and the plurality of words, sentences, or paragraphs of the body may be considered as plurality of components or portions of an email.

In some embodiments, in response to an action (for example, an action to open or access the email may include an action to preview the email or an action to open or access a new window corresponding to the email) to open (or access) the email (for example, by a user associated with an email account that has received such an email), the client device 104 may generate a request (for example, an API request) to obtain user data associated with the user (who is associated with the email). The request may be automatically generated in response to an action to open (or access) an email. An advantage to obtaining data in response to a request may include receiving only the most up-to-date user data. Alternatively, in some embodiments, user data associated with a user may be periodically or continuously obtained by the client device 104. An advantage of periodically or continuously receiving user data may include saving time that would be required to request and obtain user data. The user data associated with the activities of one or more users may be periodically collected and stored in the user data database 138 so as to allow the client device 104 to access such user data when needed. For example, a company may collect user data associated with each of its employees and store it in a database and use such user data when needed.

In some embodiments, in response to the sent request, the client device 104 may obtain user data, for example, via a network 150. Alternatively, as noted above, the client device 104 may periodically or continuously obtain user data via, for example, a network 150. The obtained user data may include user data associated a specific time period. For example, the obtained user data may include user data associated with a time stamp within the past year, within the past two years, within the past few months, etc. The time stamp may correspond to time at which the user data was collected and stored in the user data database 138. Since user habits change over time, some user data (for example, older user data) may not be relevant anymore. Accordingly, only relevant user data may be obtained or used. The relevance of the user data may be determined (for example, by the computer system 102 or a client device 104) by comparing the newer user data with the older user data and determining whether there are any differences between the older user data and the newer user data that exceed a predetermined threshold. If such a threshold is exceeded, then the older user data may be deleted from the user data database 138 and the newer user data may be obtained (or used for customizing an email) by the client device 104. This way, user data that is not relevant may not need to be communicated or used. For example, older user data may indicate that a user spends an average (or total) time of less than five seconds looking at an email, while the newer user data may indicate that the same user now spends an average (or total) time of thirty seconds looking at an email. This would suggest that the user habit has changed in recent times and therefore, older user data may no longer be relevant. Accordingly, only relevant user data may be obtained or used.

In some embodiments, user data associated with a user may include email activity data associated with the user's previous activity with emails. The email activity data may include data regarding the user's time (for example, average amount of time, total amount of time, etc.) of interaction with one or more emails, the user's average amount of scrolls (or the total amount of scrolls) through one or more emails, or the user's interaction with links within one or more emails. The email activity data may be tracked by using content inserted into the email, like a hyperlink, tracking code, etc. that includes a tracking pixel. A tracking pixel may be a 1×1 pixel (or larger) or a pixel tag that is loaded when a document or an email is opened or when a hyperlink is accessed. Or embodiments may use a tracking font, a tracking script, or various other remote resources called when rendering by a rendering engine. The tracking pixel may be associated with a URL that corresponds to a memory location on a server (for example, computer system 102). When a document, email, or hyperlink that has a tracking pixel is opened, the opening application may parse the document (or email or hyperlink), detect the URL, and respond by triggering a request to a web server where the tracking pixel is hosted. The server may then send a pixel tag to an IP address (from which the document, email, or hyperlink was opened or accessed) and that IP address may be logged by the web server (for example, computer system 102). In addition to the IP address, various other information associated with, for example, a user that opened or otherwise accessed the document, email, or hyperlink may be obtained. Such other information may include an operating system used, types of website or email used, type of client used, screen resolution, time the document (or email or hyperlink) was read or otherwise accessed, interaction with links within a document or email, and activities on the website during a session. In some embodiments, the user scrolls may also be tracked based on a user's action and a location of a call to action button/link.

In some embodiments, the email activity data associated with a user may be collected from a user each time the user accesses his/her email. For example, a company monitoring activities of its employees may collect email activity data associated with each user. The email activity data for each user may be stored in the user data database 138 along with a time stamp (for example, the time associated with the user's activity with an email). As user habits and activities change over time, certain email activity data may not be as relevant as other email activity data (for example, email activity data that are more recent may be more relevant to the user than older email activity data). Accordingly, in some embodiments, the email activity data may be associated with weights and the weights associated with the email activity data may be based on relevance of the email activity data (for example, email activity data that are more recent may be more relevant to the user than older email activity data). The weights associated with the email activity data may be periodically or dynamically modified based on a change in relevance of the email activity data. For example, a weight associated with email activity data at a current time may be higher than the weight associated with the same email activity data one year after the current time.

In some embodiments, the client device 104 (for example, the customization subsystem 142) may determine components of the plurality of components of the email to be displayed in a customized email based on the user data (for example, email activity data) such that the customized email includes the components and excludes one or more other components of the plurality of components of the email. In other words, the customization subsystem 142 may select a subset of components of the plurality of components to be displayed in a customized email and one or more other components to be excluded from being displayed in the customized email based on the user data (for example, email activity data). Alternatively, or additionally, the customization of the email may also be performed such that the customized email includes one or more components that are highlighted, that are capitalized, or that are formatted (for example, modifying the font, paragraph spacing, etc.) and other components of the customized email that are not highlighted, capitalized, or formatted. In other words, a customized email may include one or more components that are selected to be highlighted, capitalized, or formatted and may include other components that are not highlighted, capitalized, or formatted. Alternatively, or additionally, each of the components included in the customized email may be highlighted, capitalized, or formatted (for example, modifying the font, paragraph spacing, etc.), while one or more other components of the email are excluded from the customized email. Alternatively, or additionally, one or more components included in the customized email may be highlighted, capitalized, or formatted (for example, modifying the font, paragraph spacing, etc.), while a first subset of other components of the email are excluded from the customized email and while a second subset of the other components of the email are included in the customized email but not highlighted, capitalized, or formatted. In other words, a customized email may include one or more components of the email that are highlighted, capitalized, or formatted and may include a first subset of other components of the email that are not highlighted, capitalized, or formatted, while a second subset of the other components of the email are excluded from the customized email. Such customization may be based on user data (for example, email activity data, user activity data, or web site activity data).

In some embodiments, the customization of an email may be based on a portion of the obtained user data (for example, a portion of the obtained email activity data, user activity data, or website activity data). The client device 104 (for example, the customization subsystem 142) may determine a portion of the user data that is relevant to the user and other portions of the user data that are not relevant to the user and utilize the relevant portion of the user data to determine a subset of components of the plurality of components of the email to be included in a customized email such that the customized email includes the subset of components and excludes one or more other components of the plurality of components of the email. As discussed above, the relevant portion of the user data may be determined based on differences between the newer user data and the older user data. For example, older user data may indicate that a user spends an average (or total) time of less than five seconds looking at an email, while the newer user data may indicate that the same user now spends an average (or total) time of thirty seconds looking at an email. If a threshold for a difference between older user data and newer user data is five seconds, then the client device 104 may determine that the newer user data (for example, indicating that the user now spends an average (or total) time of thirty seconds looking at an email) may be more relevant and that the newer user data should be utilized, while excluding the older user data from being utilized. Accordingly, the client device 104 may utilize a portion of the obtained user data (for example, a portion of the user data that is relevant to the user) to determine a subset of components of the plurality of components of the email to be included in a customized email such that the customized email includes the subset of components and excludes one or more other components of the plurality of components of the email.

Alternatively, or additionally, the client device 104 may obtain a subset of the user data (including a subset of the newer user data and a subset of the older user data) from the user data database 138 and may determine whether the older user data is relevant or not based on a comparison of the subset of the newer user data and the subset of the older user data. If the client device 104 determines that difference between the subset of the new user data and the subset of the older user data exceeds a predetermined threshold, then the computer system 102 may only obtain the rest of the newer user data to utilize the newer user data to determine a subset of components of the plurality of components of the email to be included in a customized email such that the customized email includes the subset of components and excludes one or more other components of the plurality of components of the email. Accordingly, only relevant user data may be obtained or used.

In some embodiments, the customization of the email may be performed after the email has been dispatched (form a sender, for example, another client device 104 or computer system 102) to a client device 104, after the email has been received by the intended recipient user, and after an action (for example, by the recipient user) has been taken to open (or access) the email. As an example, the email activity data may indicate that the user only spends a total (or average) of less than seven seconds looking at an email. Based on such email activity data, the customization subsystem 142 may determine that a customized email should only include, for example, the subject and a first paragraph of the body of the email, and that other components of the email (for example, header, footer, other paragraphs of the body of the email, image, etc.) should be excluded. Additionally, the customization subsystem 142 may also take into account the weights associated with different pieces of data in the email activity data and may determine a subset of components of the plurality of components of the email to be included in a customized email based on the email activity data and the weights associated with the email activity data. As an example, a higher weight may be assigned to email activity data associated with the past year compared to email activity associated with dates prior to the past year (that is, email activity data indicating that a user spends a total (or average) of fifteen seconds looking at one or more emails in the past year may be assigned a higher weight than email activity data that indicates that the user spent a total (or average) less than five seconds looking at one or more email prior to the past year). Based on such email activity data and weights associated with the email activity data, the customization subsystem 142 may determine that a customized email should include, for example, the subject, the header, the first two paragraphs in the body of the email, and the image, and that other components of the email (for example, footer, other paragraphs in the body of the email, etc.) should be excluded.

As another example, the email activity data may indicate that the user interacts often with links within emails. Based on such data associated with the email activity data, the customization subsystem 142 may determine that a customized email should include, for example, the subject, the header, and any paragraph in the body of the email that includes a link, and that other components of the email (for example, footer, other paragraphs in the body of the email, image, etc.) should be excluded. Additionally, the customization subsystem 142 may take into account weights associated with user's interaction with links within emails and based on this, may determine a subset of components of the plurality of components of the email to be included in a customized email and one or more other components to be excluded from the customized email.

In some embodiments, the customization subsystem 142 may customize an email such that one or more portions of one or more components of the email are included in the customized email and the other portions of the one or more components or the other components (other than the one or more components) of the email are excluded from the customized email. As an example, the email activity data may indicate that a user spends a total (or average) time of less than three seconds on an email. Based on such email activity data, the customization subsystem 112 may determine that a customized email should only include, for example, a portion of the subject and a portion of the first paragraph of the body of the email, and that other components of the email (for example, header, footer, other portion of the subject, other paragraphs of the body of the email, other portions of the first paragraph, image, etc.) should be excluded.

In some embodiments, the client device 104 (for example, the display subsystem 146) may cause the components to be displayed in a customized email via a user interface (for example, a user interface of the client device 104 or another client device 104) without displaying one or more other components of the plurality of components in the customized email. In some embodiments, only the customized email may be displayed without displaying the email prior to customization. A user can access the customized email by accessing his or her email account via, for example, a client device 104.

In some embodiments, the obtained user data may include user activity data. The user activity data may be associated with the user's previous activity related to the contents of the obtained email. In some embodiments, client device 104 (for example, the customization subsystem 142) may scan the contents of the obtained email. Based on scanning the email, the customization subsystem 142 may identify the contents associated with the email. In some embodiments, the client device 104 may generate a request (for example, an API request) to obtain user activity data, which includes data associated with the user's activity related to the contents of the email. The request may be generated based on the scanned contents of the email and an identity of the user associated with the email.

In some embodiments, user activity data may be stored in a user data database 138. User activity data may correspond to a user's previous activity. For example, if a user has an account with a bank, the user activity data associated with the user may include data indicating dates and times of withdrawal, amount of withdrawals, dates and times of deposit, amount of deposits, and other data of the user's activity connected to the bank account associated with the user. Further, if a user has a credit card account with a bank, the user activity data associated with the user may include data indicating date and time of previous payment, amount of previous payment, date and time of next payment, amount of next payment, and other data of the user's activity connected to the credit card account associated with the user. Although the above examples relate to a user's bank account and credit card account, it should be understood that user activity data may include any data associated with a user's activity. The user activity data may be collected by the computer system 102 each time a user takes an action, for example, with his/her bank account or credit card account and the user activity data may be stored (along with a user's identification) in the user data database 138.

In some embodiments, in response to a request for user activity data related to the contents of the email, the client device 104 may retrieve user activity data related to the contents of the email. In other words, if the request for user activity data is related to a user's credit card account, then the client device 104 may retrieve user activity data related to the user's credit card account. As an example, an email may include contents associated with a credit card account and a plurality of components of the email may include "Your next payment is due soon" and "Thank you for your payment." Based on such contents of the email and based on scanning of the email, the client device 104 may determine that the contents of the email to correspond to a credit card account. Accordingly, the client device 104 may request to retrieve a user's activity data associated with the user's credit card account. If the obtained user activity data indicates that the user recently made a credit card payment, then the customization subsystem 142 may determine (or select) a subset of components (for example, "Thank you for your payment") to be included in a customized email based on the user activity data (for example, an indication that the user recently made a credit card payment) such that the customized email includes the subset of components (for example, "Thank you for your payment") and excludes the other component (for example, "Your next payment is due soon") of the email. In other words, the customization subsystem 142 may customize an email instance of the email for a user based on user activity data such that the email instance includes a subset of components of the plurality of components and excludes one or more other components of the plurality of components. As noted above, customization of an email may be performed after the email has been dispatched to the client device from a sender (for example, another client device 104 or computer system 102), after the email has been received by the recipient, and after an action to open (or access) the email.

In some embodiments, the customization subsystem 142 may customize an email such that one or more portions of one or more components of the email are included in the customized email and the other portions of the one or more components or the other components (other than the one or more components) of the email are excluded from the customized email. As an example, an email may include contents associated with a credit card account and a plurality of components of the email may include "Your next payment is due soon" and "Payment received, thank you for your payment." Based on such contents of the email and based on scanning of the email, the client device 104 may determine that the contents of the email to correspond to a credit card account. Accordingly, the client device 104 may request to retrieve a user's activity data associated with the user's credit card account. If the obtained user activity data indicates that the user recently made a credit card payment, then the customization subsystem 142 may determine one or more portions of a component (for example, "Payment received") to be included in a customized email based on the user activity data (for example, an indication that the user recently made a credit card payment) such that the customized email includes a portion of a component (for example, "Payment received") and excludes the other components (for example, "Your next payment is due soon" and ", thank you for your payment") of the email.

In some embodiments, the client device 104 (for example, the display subsystem 146) may cause the components to be displayed in a customized email via a user interface (for example, a user interface of the client device 104 or another client device 104) without displaying one or more other components of the plurality of components in the customized email. In some embodiments, only the customized email may be displayed without displaying the email prior to customization. A user can access the customized email by accessing his or her email account via, for example, a client device 104.

In some embodiments, the obtained user data may further include website activity data. The web site activity data may include data regarding a user's interaction with one or more web sites. Web site activity data may include data identifying the content of one or more web sites visited by the user, the user's average time (or the total amount of time) of interaction with one or more websites, the user's average amount of scrolls (or the total amount of scrolls) through one or more websites, the user's interaction with links within one or more websites, the user's number of visits associated with one or more websites, the user's percentage of new sessions associated with one or more websites, the user's use of channels (for example, direct, organic search, referral, email, paid search, other advertising) to access one or more websites, whether the user's visit to one or more websites was a single page visit, the user's conversion (for example, email subscriptions, contact form submissions, content downloads, engaging in live chat, watching videos, etc.) associated with one or more websites, a number of pages visited in one or more websites, whether the user visited one or more websites from a mobile device, or the user's landing and exit pages associated with one or more websites.

The website activity data of a user may be collected periodically (for example, by the computer system 102). For example, an employee of the company may be tracked periodically, and the website activity data of the employee may be stored in, for example, the user data database 138. When website activity data is needed to customize an email, the client device 104 may obtain the website activity data from the user data database 138 via an API request. The website activity data may be stored in the user data database 138 along with a time stamp (for example, the time associated with the user's website activity). As user habits and activities change over time, certain website activity data may not be as relevant as other website activity data (for example, website activity data that are more recent may be more relevant to the user than older website activity data). Accordingly, in some embodiments, the website activity data may be associated with weights and the weights associated with the website activity data may be based on relevance of the website activity data (for example, website activity data that are more recent may be more relevant to the user than older website activity data). The weights associated with the website activity data may be periodically or dynamically modified based on a change in relevance of the website activity data. For example, a weight associated with website activity data at a current time may be higher than the weight associated with the same website activity data one year after the current time.

In some embodiments, the client device 104 (for example, the customization subsystem 142) may determine components of the plurality of components of the email to be included in a customized email based on the website activity data such that the customized email includes the components and excludes one or more other components of the plurality of components of the email. In other words, the customization subsystem 142 may select a subset of components of the plurality of components to be displayed in a customized email and one or more other components to be excluded from being displayed in the customized email based on the website activity data. The customization of the email may be performed after the email has been dispatched to client device 104 from a sender (for example, the computer system 102 or another client device 104) and after an action has been taken to open (or access) the email. As an example, the website activity data may indicate that the user only spends a total (or average) of less than seven seconds looking at one or more websites. Based on such website activity data, the customization subsystem 142 may determine that a customized email should only include, for example, the subject and a first paragraph of the body of the email, and that other components of the email (for example, header, footer, other paragraphs of the body of the email, image, etc.) should be excluded.

Additionally, in some embodiments, the customization subsystem 142 may also take into account the weights associated with different pieces of data in the website activity data and may determine a subset of components of the plurality of components of the email to be included in a customized email based on the website activity data and the weights associated with the website activity data. As an example, a higher weight may be assigned to website activity data associated with the past year compared to website activity associated with dates prior to the past year (that is, website activity data indicating that a user spends a total (or average) of fifteen seconds looking at one or more websites in the past year may be assigned a higher weight than website activity data that indicates that the user spent a total (or average) less than five seconds looking at one or more websites prior to the past year). Based on such website activity data and weights associated with the website activity data, the customization subsystem 142 may determine that a customized email should include, for example, the subject, the header, the first two paragraphs in the body of the email, and the image, and that other components of the email (for example, footer, other paragraphs in the body of the email, etc.) should be excluded.

As another example, the website activity data may indicate specific content that the user views on one or more websites. For instance, website data activity may indicate that 40% of the websites that the user views are sports related, 25% of the websites are news related, 25% of the websites are related to stock trading, and 10% are miscellaneous or may indicate that a user spends a total (or average) time of two minutes on sports related websites and spends a total (or average) time of thirty seconds on news related websites. Based on such website activity data, the client device 104 (for example, the customization subsystem 142) may customize an email such that the customized email includes the subject and all the paragraphs of the body of the email and excludes other components such as header and footer of the email when the contents of the email are sports related. On the other hand, based on such website activity data, the client device 104 (for example, the customization subsystem 142) may customize an email such that the customized email includes the subject and a first paragraph of the body of the email and excludes other components such as header, footer, and other paragraphs of the body of the email when the contents of the email are news related. Additionally, the customization subsystem 142 may take into account weights associated with user's web site activity and, based on the weights, may determine a subset of components of the plurality of components of the email to be included in a customized email and one or more other components to be excluded from the customized email.

In some embodiments, the customization subsystem 142 may customize an email such that one or more portions of one or more components are included in the customized email and the other portions of the one or more components or the other components (other than the one or more components) are excluded from the customized email. As an example, the website activity data may indicate that a user spends a total (or average) time of ten seconds on sports related websites and spends a total (or average) time of twenty seconds on news related websites. If the content of an email is sports related, then based on such website activity data, the customization subsystem 142 may determine that a customized email should include a portion of the subject and a portion of the first paragraph of the body of the email and should exclude other components of the email (for example, the other portion of the subject, the other portion of the first paragraph of the body of the email, the header, footer, image, etc.). If the content of the email is news related, the based on such website activity data, the customization subsystem 142 may determine that a customized email should include a portion of the subject and a portion of the first and second paragraphs of the body of the email and should exclude other components of the email (for example, the other portion of the subject, the other portions of the first and second paragraphs of the body of the email, the header, footer, image, etc.).

In some embodiments, the client device 104 (for example, the display subsystem 146) may cause the components to be displayed in a customized email via a user interface (for example, a user interface of the client device 104 or another client device 104) without displaying one or more other components of the plurality of components in the customized email. In some embodiments, only the customized email may be displayed without displaying the email prior to customization. A user can access the customized email by accessing his or her email account on, for example, a client device 104. The client device 104 communicates with other devices or databases via, for example, the communication subsystem 144. Although certain examples are provided above to customize an email based on user data, it should be understood that the customization of an email may be based on one or more pieces of data of the user data.

Customizing an email based on the above techniques can be advantageous for several reasons. As an example, an intended recipient may receive content in the customized email that the intended recipient is likely to read. As another example, the intended recipient is more likely to receive content in the customized email that is relevant to the recipient user. As a further example, the recipient user may be more likely to positively engage (for example, via email subscriptions, via clicking on links included in the customized email, via contact form submissions, via content downloads, via engaging in live chat, via watching videos, etc.) with the content received in the customized email.

Further, customizing an email after the email has been dispatched to a recipient, after the recipient has received the email, and after an action to open (or access) the email is taken may also be advantageous because it may allow the customization to be performed only when a user is ready to view the email. In other words, by waiting to customize the email until the user decides to view the email allows the email to be customized with the most up-to-date user data that is most relevant to the user, thereby displaying content to the user that the user is likely to read, that is most relevant to the user, and that the user is likely going to engage with. An email customized a month (or any other significant period of time) prior to the user viewing the email may not be as relevant to the user as an email customized at the time the user intends to view the email.

Details with regard to training a prediction model and utilizing a prediction model for predicting a subset of components to be included in a customized email and one or more other components to be excluded from the customized email are not repeated for the sake of brevity. All the details discussed above with regard to a prediction model and computer system 102 also apply to this portion of the disclosure associated with the client device 104. In other words, the details associated with the computer system 102 (with regard to training the prediction model and utilizing the prediction model for customizing an email) may also be performed by the client device 104.

Example Flowcharts

Figure 3:
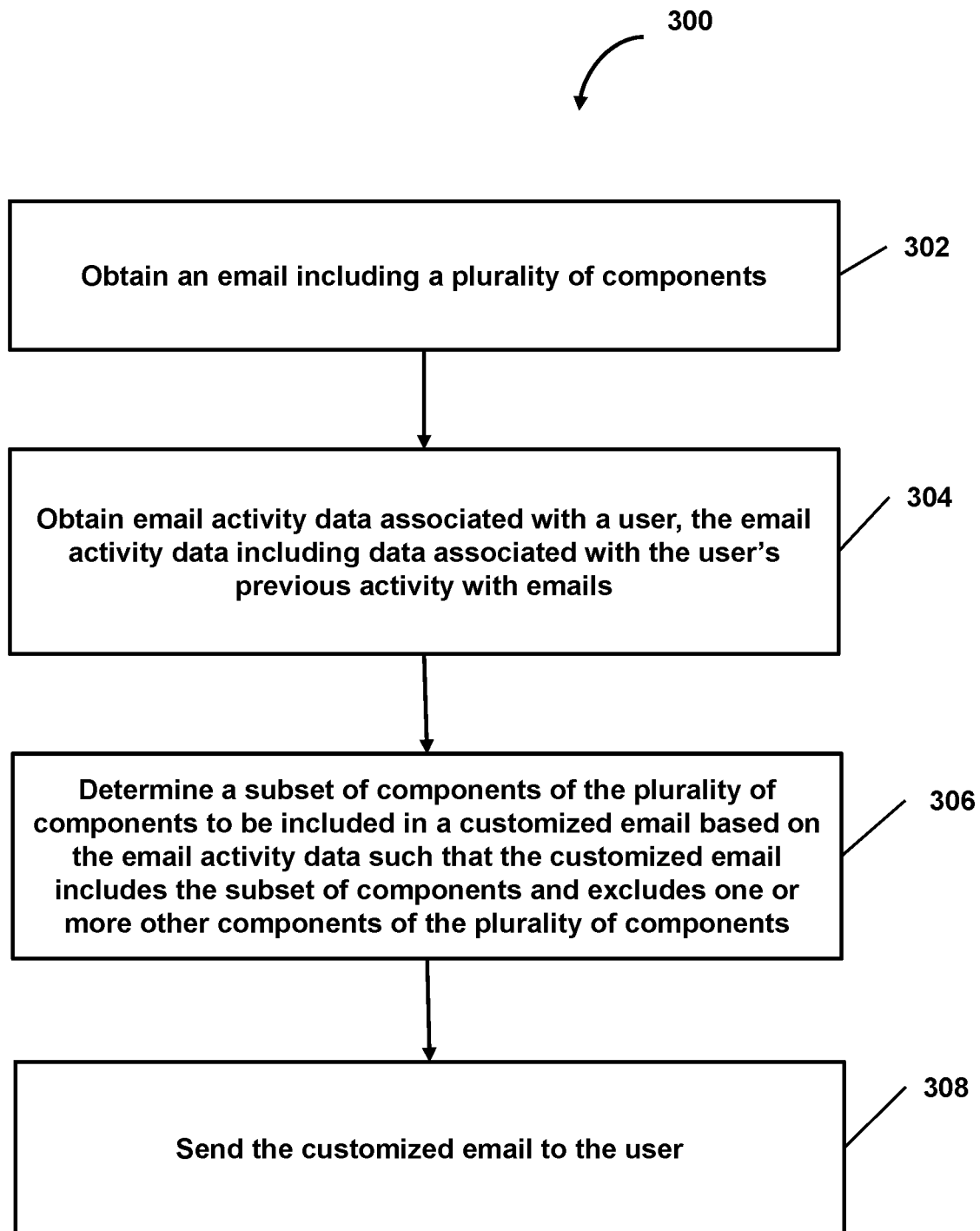
FIG. 3 shows a flowchart of a method of facilitating customization of an email, in accordance with one or more embodiments.
Figure 4:
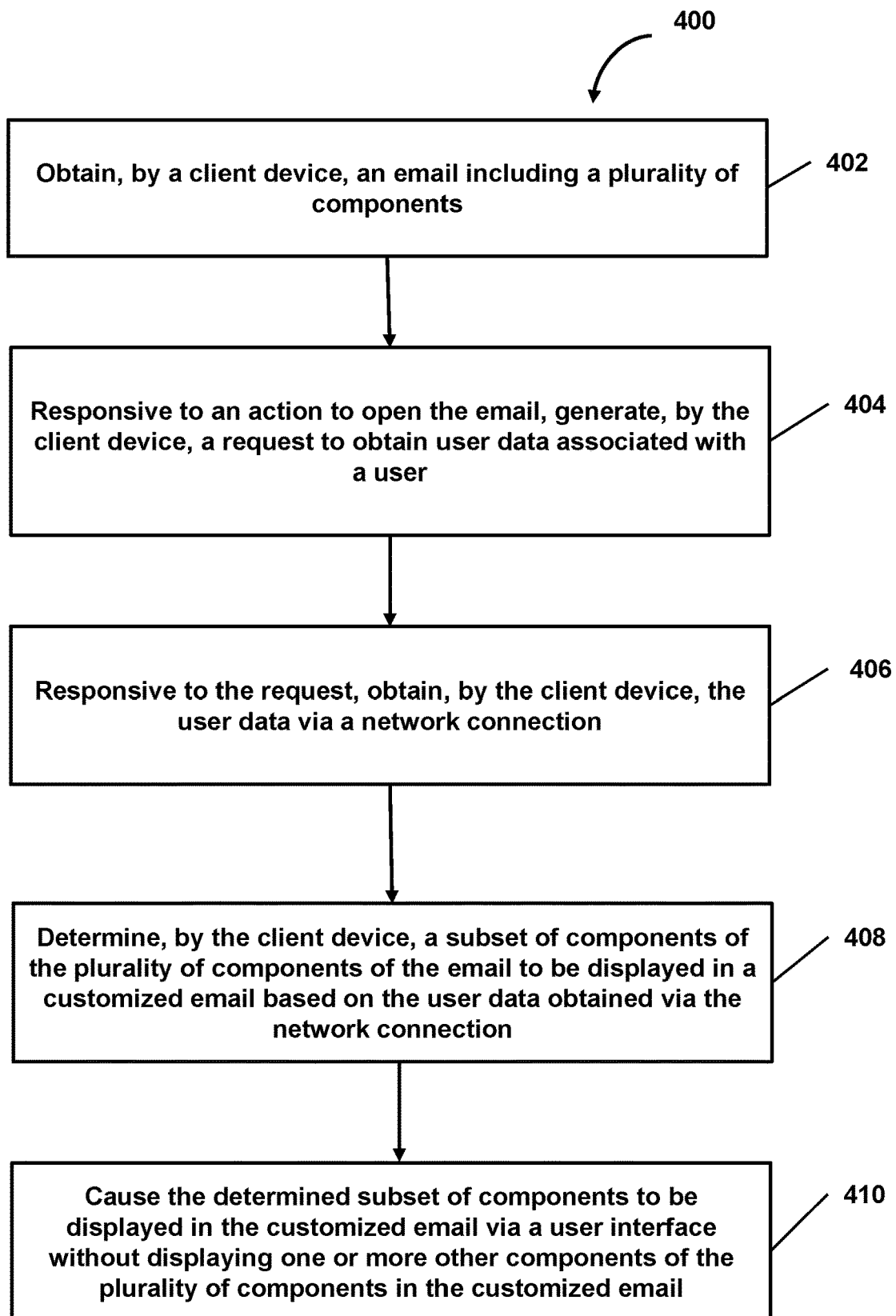
FIG. 4 shows a flowchart of another method of facilitating customization of an email, in accordance with one or more embodiments.
Figure 5:
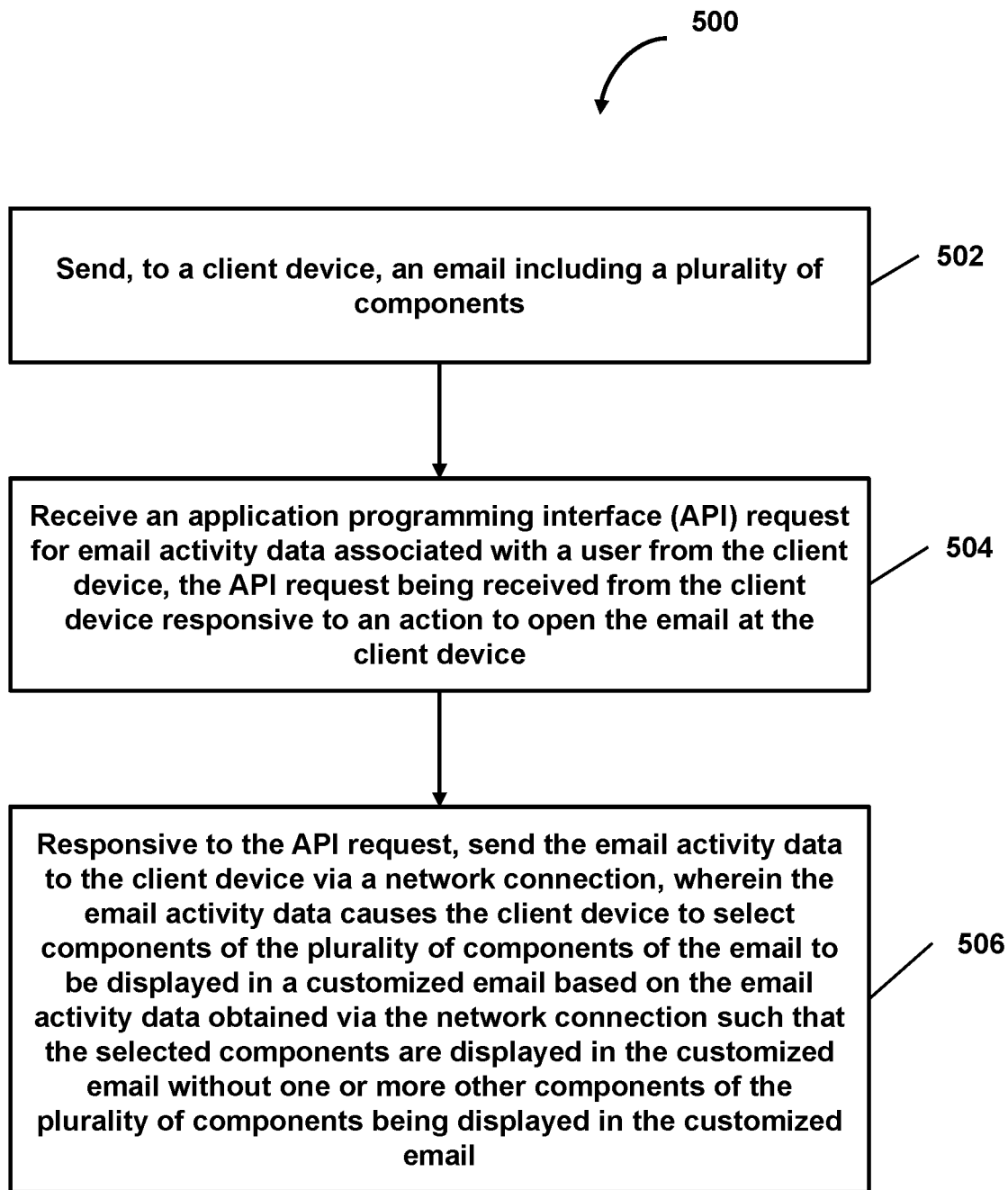
FIG. 5 shows a flowchart of a method of causing customization of an email at a client device, in accordance with one or more embodiments.

FIGS. 3-5 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 shows a flowchart of a method 300 of facilitating customization of an email, in accordance with one or more embodiments. In an operation 302, an email including a plurality of components may be obtained. As an example, the plurality of components or portions of an email may include a header, footer, signature block, subject, body, image, or other components of the email. In an operation 304, email activity data associated with a user may be obtained. The user may be associated with the email (for example, the user may be the intended recipient of the email). The email activity data may include data associated with the user's previous activity with emails. The email activity data may include data regarding the user's time (for example, average amount of time, total amount of time, etc.) of interaction with one or more emails, the user's amount of scrolls (for example, average amount of scrolls, total amount of scrolls, etc.) through one or more emails, or the user's interaction with links within one or more emails. The email activity data may be tracked by using content inserted into the email, like a hyperlink, tracking code, etc. that includes a tracking pixel. For example, a company that monitors activities of its employees may collect email activity data associated with each user and may store the email activity data in a database. The email activity data for each user may be stored in the user data database 138 along with a time stamp (for example, the time associated with the user's activity with an email). Obtaining the email activity data may also include obtaining weights associated with the email activity data. As user habits and activities change over time, certain email activity data may not be as relevant as other email activity data (for example, email activity data that are more recent may be more relevant to the user than older email activity data). Accordingly, weights associated with the email activity data may also be obtained to determine the relevance of each piece of email activity data. In addition to obtaining email activity data, user activity data and website activity may also be obtained. The user activity data may be associated with the user's previous activity related to the contents of the obtained email and the web site activity data may include data regarding a user's interaction with one or more websites. The obtained user data may include user data associated a specific time period. For example, the obtained user data may include user data associated with a time stamp within the past year, within the past two years, within the past few months, etc. The time stamp may correspond to time at which the user data was collected and stored in a database. Since user habits change over time, some user data (for example, older user data) may not be relevant anymore. Accordingly, only relevant user data may be obtained. The relevance of the user data may be determined by comparing the newer user data with the older user data and determining whether there are any differences between the older user data and the newer user data that exceed a predetermined threshold. If such a threshold is exceeded, then the older user data may be deleted from the database and the newer user data may be obtained by the client device. This way, user data that is not relevant may not need to be communicated or used.

In an operation 306, a subset of components of the plurality of components to be included in a customized email may be determined based on the obtained email activity data (or user activity data or website activity data). The customized email may be customized such that the customized email includes the subset of components and excludes one or more other components of the plurality of components of the email. For example, the email activity data may indicate that the user only spends a total (or average) of less than seven seconds looking at an email. Based on such email activity data, it may be determined that a customized email should only include, for example, the subject and a first paragraph of the body of the email, and that other components of the email (for example, header, footer, other paragraphs of the body of the email, image, etc.) should be excluded. In an operation 308, the customized email may be sent to the user via a network connection. In the operations described in FIG. 3, the obtained email may be customized (based on email activity data, user activity data, or website activity data) before being dispatched to an intended recipient.

FIG. 4 shows a flowchart of another method 400 of facilitating customization of an email, in accordance with one or more embodiments. In an operation 402, a client device may obtain an email including a plurality of components. As an example, the plurality of components or portions of an email may include a header, footer, signature block, subject, body, image, or other components of the email. In an operation 404, the client device may generate a request (for example, an API request) to obtain user data associated with a user in response to an action to open (or access) the email. The user may be the recipient of the email. The request may be automatically generated in response to an action to open (or access) an email. The user data may include email activity data, user activity data, or web site activity data. The email activity data may include data associated with the user's previous activity with emails, the user activity data may be associated with the user's previous activity related to the contents of the obtained email, and the website activity data may include data regarding a user's interaction with one or more websites.

In an operation 406, the client device may obtain the user data via a network connection in response to the generated request. The obtained user data may include user data associated a specific time period. For example, the obtained user data may include user data associated with a time stamp within the past year, within the past two years, within the past few months, etc. The time stamp may correspond to a time at which the user data was collected and stored in a database. Since user habits change over time, some user data (for example, older user data) may not be relevant anymore. Accordingly, only relevant user data may be obtained. The relevance of the user data may be determined by comparing the newer user data with the older user data and determining whether there are any differences between the older user data and the newer user data that exceed a predetermined threshold. If such a threshold is exceeded, then the older user data may be deleted from the database and the newer user data may be obtained by the client device. This way, user data that is not relevant may not need to be communicated or used.

In an operation 408, the client device may determine a subset of components of the plurality of components of the email to be displayed in a customized email based on the user data obtained via the network connection. Specifically, the client device may determine a subset of components of the plurality of components of the email to be displayed in a customized email based on the user data such that the customized email includes the determined subset of components and excludes one or more other components of the plurality of components of the email. As an example, the user data may indicate that the user only spends a total (or average) of less than seven seconds looking at an email. Based on such user data, it may be determined that a customized email should only include, for example, the subject and a first paragraph of the body of the email, and that other components of the email (for example, header, footer, other paragraphs of the body of the email, image, etc.) should be excluded. Obtaining the user data may also include obtaining weights associated with the user data. As user habits and activities change over time, certain user data may not be as relevant as other user data (for example, user data that are more recent may be more relevant to the user than older user data). Accordingly, weights associated with the user data may also be obtained to determine the relevance of each piece of user data.

In an operation 410, the determined subset of components may be caused to be displayed in a customized email via a user interface without displaying one or more other components of the plurality of components in the customized email.

FIG. 5 shows a flowchart of a method 500 of causing customization of an email at a client device, in accordance with one or more embodiments. In some embodiments, a server (for example, a computer system) may cause customization of an email at a client device. In an operation 502, an email including a plurality of components may be sent to a client device by, for example, a computer system. As an example, the plurality of components or portions of an email may include a header, footer, signature block, subject, body, image, or other components of the email.

In an operation 504, the computer system may receive a request (for example, an API request) for email activity data associated with a user from the client device. The request may be received in response to an action taken to open the email at the client device. The request may be automatically generated in response to an action to open (or access) an email and the email activity data may include data associated with the user's previous activity with emails.

In an operation 506, in response to the request, the computer system may send the email activity data to the client device via a network connection. The email activity data may cause the client device to select a subset of components of the plurality of components of the email to be displayed in a customized email based on the email activity data obtained via the network connection such that the selected subset of components are displayed in the customized email without one or more other components of the plurality of components of the email being displayed in the customized email. Specifically, the computer system may cause the client device to determine components of the plurality of components of the email to be displayed in a customized email based on the email activity data such that the customized email includes the determined components and excludes one or more other components of the plurality of components of the email. As an example, the email activity data may indicate that the user only spends a total (or average) of less than seven seconds looking at an email. Based on such user data, the computer system may cause the client device to determine that a customized email should only include, for example, the subject and a first paragraph of the body of the email, and that other components of the email (for example, header, footer, other paragraphs of the body of the email, image, etc.) should be excluded. Sending the email activity data may also include sending weights associated with the email activity data. As user habits and activities change over time, certain email activity data may not be as relevant as other email activity data (for example, email activity data that are more recent may be more relevant to the user than older email activity data). Accordingly, weights associated with the email activity data may also be sent to cause the client device to determine the relevance of each piece of user data.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, model database(s) 136, user data database 138, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies).

The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118, 142-146, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 and 142-146 described herein is for illustrative purposes, and is not intended to be limiting, as any of subsystems 112-118 and 142-146 may provide more or less functionality than is described. For example, one or more of subsystems 112-118 and 142-146 may be eliminated, and some or all of its functionality may be provided by other ones of subsystems 112-118 and 142-146. As another example, additional subsystems may be programmed to perform some or all of the functionality attributed herein to one of subsystems 112-118 and 142-146.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A system for customizing an email at a client device, the system comprising a client device that comprises one or more processors programmed with computer program instructions that, when executed, cause the client device to: obtain an email including a plurality of components; responsive to an action to open the email, generate an application programming interface (API) request to obtain email activity data associated with a user; responsive to the API request, obtain the email activity data via a network connection; select a subset of components of the plurality of components to be displayed in a customized email based on the email activity data; and cause the subset of components to be displayed in the customized email via a user interface without displaying other components of the plurality of components in the customized email.

2. The system of embodiment 1, wherein the email activity data includes data associated with the user's previous activity with emails.

3. The system of any of embodiments 1 or 2, wherein the data associated with the user's previous activity with the emails includes data regarding the user's time of interaction with the emails, the user's amount of scrolls through the emails, or the user's interaction with links within the emails.

4. The system of any of embodiments 1-3, wherein the API request includes a request to obtain user activity data, wherein the user activity data includes data regarding the user's activity related to contents of the email.

5. The system of any of embodiments 1-4, wherein the data regarding the user's activity related to contents of the email includes data regarding a previous action taken by the user related to the contents of the email.

6. The system of any of embodiments 1-5, wherein selecting the subset of components of the plurality of components comprises selecting a portion of a component of the subset of the components to be displayed in the customized email based on the email activity data, and wherein causing the subset of components to be displayed comprises causing the portion of the component of the subset of components to be displayed in the customized email without displaying one or more other portions of the component of the subset of components in the customized email.

7. The system of any of embodiments 1-6, wherein the action to open the email includes an action to preview the email or an action to open a new window corresponding to the email.

8. The system of any of embodiments 1-7, wherein the client device is caused to scan contents of the email, and wherein the API request includes a request to obtain user activity data based on the scanned contents of the email.

9. A method being implemented by one or more processors configured to execute one or more computer program instructions, the method performing operations comprising those of any of embodiments 1-8.

10. One or more non-transitory, computer-readable media storing instructions that, when executed by one or more processors, effectuate operations comprising those of any of embodiments 1-8.

11. A method comprising: obtaining, by a client device, an email including a plurality of components; responsive to an action to open the email, obtaining, by the client device, user data associated with a user; determining, by the client device, a subset of components of the plurality of components of the email to be displayed in a customized email based on the user data; and causing the subset of components to be displayed in the customized email via a user interface without displaying one or more other components of the plurality of components in the customized email.

12. The method of embodiment 11, wherein the user data includes email activity data including data associated with the user's previous activity with emails.

13. The method of any of embodiments 11 or 12, wherein the data associated with the user's previous activity with the emails includes data regarding the user's time of interaction with the emails, the user's amount of scrolls through the emails, or the user's interaction with links within the emails.

14. The method of any of embodiments 11-13, wherein the user data includes user website data including data associated with the user's interaction with one or more websites.

15. The method of any of embodiments 11-14, wherein the data associated with the user's interaction with the one or more websites includes data regarding the user's time of interaction with the one or more websites, the user's amount of scrolls through the one or more websites, or the user's interaction with links within the one or more websites.

16. The method of any of embodiments 11-15, wherein the user data includes user activity data including data regarding a previous action taken by the user related to contents of the email.

17. The method of any of embodiments 11-16, wherein determining the subset of components of the plurality of components comprises determining, by the client device of the user, a portion of a component of the subset of components to be displayed in the customized email based on the user data, and wherein causing the subset of components to be displayed comprises causing the portion of the component of the subset of components to be displayed in the customized email via the user interface without displaying one or more other portions of the component of the subset of components in the customized email.

18. A system comprising a computer system that comprises one or more processors programmed with computer program instructions that, when executed, cause the computer system to perform operations comprising those of any of embodiments 11-17.

19. One or more non-transitory, computer-readable media storing instructions that, when executed by one or more processors, effectuate operations comprising those of any of embodiments 11-17.

20. A system for causing customization of an email at a client device, the system comprising a computer system that comprises one or more processors programmed with computer program instructions that, when executed, cause the computer system to: send, to a client device, an email including a plurality of components; receive an application programming interface (API) request for email activity data associated with a user from the client device, the API request being received from the client device responsive to an action to open the email at the client device; and responsive to the API request, send the email activity data to the client device via a network connection, wherein the email activity data causes the client device to select a subset of components of the plurality of components of the email to be displayed in a customized email based on the email activity data such that the subset of components is displayed in the customized email without one or more other components of the plurality of components being displayed in the customized email.

21. The system of embodiment 20, wherein the email activity data includes data associated with the user's previous activity with emails, and wherein the data associated with the user's previous activity with the emails includes data regarding the user's time of interaction with the emails, the user's amount of scrolls through the emails, or the user's interaction with links within the emails.

22. A system comprising a computer system that comprises one or more processors programmed with computer program instructions that, when executed, cause the computer system to perform operations comprising those of any of embodiments 20 or 21.

23. One or more non-transitory, computer-readable media storing instructions that, when executed by one or more processors, effectuate operations comprising those of any of embodiments 20 or 21.

What is claimed is:

1. A system for customizing an email at a client device, the system comprising:
   a client device that comprises one or more processors programed with computer program instructions that, when executed, cause the client device to:
   obtain an email including a plurality of components;
   responsive to an action to open the email, generate an application programming interface (API) request to obtain email activity data associated with a user;
   responsive to the API request, obtain a subset of the email activity data via a network connection and obtain weights associated with each piece of data of the subset of the email activity data, the subset of the email activity data corresponding to data associated with the user's previous activity with other emails during a time period prior to a time associated with the action to open the email;
   select a subset of components of the plurality of components to be displayed in a customized email based on the subset of the email activity data and the weights associated with said each piece of data of the subset of the email activity data; and
   cause the subset of components to be displayed in the customized email via a user interface without displaying other components of the plurality of components in the customized email,
   wherein the weights associated with said each piece of data of the subset of the email activity data is based on a time stamp associated with said each piece of data of the subset of the email activity data.

2. The system according to claim 1, wherein the data associated with the user's previous activity with the other emails includes data regarding the user's time of interaction with the other emails, the user's amount of scrolls through the other emails, or the user's interaction with links within the other emails.

3. The system according to claim 1, wherein the API request includes a request to obtain user activity data, wherein the user activity data includes data regarding the user's activity related to contents of the email.

4. The system according to claim 3, wherein the data regarding the user's activity related to contents of the email includes data regarding a previous action taken by the user related to the contents of the email.

5. The system according to claim 1,
   wherein selecting the subset of components of the plurality of components comprises selecting a portion of a component of the subset of the components to be displayed in the customized email based on the subset of the email activity data, and
   wherein causing the subset of components to be displayed comprises causing the portion of the component of the subset of components to be displayed in the customized email without displaying one or more other portions of the component of the subset of components in the customized email.

6. The system according to claim 1, wherein the action to open the email includes an action to preview the email or an action to open a new window corresponding to the email.

7. The system according to claim 1,
   wherein the client device is caused to scan contents of the email, and
   wherein the API request includes a request to obtain user activity data based on the scanned contents of the email.

8. A method comprising:
   obtaining, by a client device, an email including a plurality of components;
   responsive to an action to open the email, obtaining, by the client device, user data associated with a user, wherein obtaining the user data includes obtaining a subset of email activity data, and wherein the subset of the email activity data corresponds to data associated with the user's previous activities with other emails during a time period prior to a time associated with the action to open the email;
   responsive to the action to open the email, obtaining weights associated with each piece of data of the subset of the email activity data;
   determining, by the client device, a subset of components of the plurality of components of the email to be displayed in a customized email based on the user data and the weights associated with said each piece of data of the subset of the email activity data; and
   causing the subset of components to be displayed in the customized email via a user interface without displaying one or more other components of the plurality of components in the customized email,
   wherein the weights associated with said each piece of data of the subset of the email activity data is based on a time stamp associated with said each piece of data of the subset of the email activity data.

9. The method according to claim 8, wherein the data associated with the user's previous activity with the other emails includes data regarding the user's time of interaction with the other emails, the user's amount of scrolls through the other emails, or the user's interaction with links within the other emails.

10. The method according to claim 8, wherein the user data includes user website data including data associated with the user's interaction with one or more websites.

11. The method according to claim 10, wherein the data associated with the user's interaction with the one or more websites includes data regarding the user's time of interaction with the one or more web sites, the user's amount of scrolls through the one or more web sites, or the user's interaction with links within the one or more web sites.

12. The method according to claim 8, wherein the user data includes user activity data including data regarding a previous action taken by the user related to contents of the email.

13. The method according to claim 8, wherein determining the subset of components of the plurality of components comprises determining, by the client device of the user, a portion of a component of the subset of components to be displayed in the customized email based on the user data, and wherein causing the subset of components to be displayed comprises causing the portion of the component of the subset of components to be displayed in the customized email via the user interface without displaying one or more other portions of the component of the subset of components in the customized email.

14. One or more non-transitory, computer-readable media storing instructions that, when executed by one or more processors, effectuate operations comprising:
   obtaining, by a client device, an email including a plurality of components;
   responsive to an action to open the email, obtaining, by the client device, user data associated with a user, wherein obtaining the user data includes obtaining a subset of email activity data, and wherein the subset of the email activity data corresponds to data associated with the user's previous activities with other emails during a time period prior to a time associated with the action to open the email;
   responsive to the action to open the email, obtaining weights associated with each piece of data of the subset of the email activity data;
   determining, by the client device, a subset of components of the plurality of components of the email to be displayed in a customized email based on the user data and the weights associated with said each piece of data of the subset of the email activity data; and
   causing the subset of components to be displayed in the customized email via a user interface without displaying one or more other components of the plurality of components in the customized email,
   wherein the weights associated with said each piece of data of the subset of the email activity data is based on a time stamp associated with said each piece of data of the subset of the email activity data.

15. The non-transitory, computer-readable media according to claim 14, wherein the data associated with the user's previous activity with the other emails includes data regarding the user's time of interaction with the other emails, the user's amount of scrolls through the other emails, or the user's interaction with links within the other emails.

16. A system for causing customization of an email at a client device, the system comprising:
   a computer system that comprises one or more processors programed with computer program instructions that, when executed, cause the computer system to:
   send, to a client device, an email including a plurality of components;
   receive an application programming interface (API) request for email activity data associated with a user from the client device, the API request being received from the client device responsive to an action to open the email at the client device; and
   responsive to the API request, send a subset of the email activity data and weights associated with each piece of data of the subset of the email activity data to the client device via a network connection, wherein the subset of the email activity data corresponds to data associated with the user's previous activities with other emails during a time period prior to a time associated with the action to open the email, wherein the subset of the email activity data and the weights associated with said each piece of data of the subset of the email activity data cause the client device to select a subset of components of the plurality of components of the email to be displayed in a customized email based on the subset of the email activity data and the weights associated with said each piece of data of the subset of the email activity data such that the subset of components is displayed in the customized email without one or more other components of the plurality of components being displayed in the customized email, and wherein the weights associated with said each piece of data of the subset of the email activity data is based on a time stamp associated with said each piece of data of the subset of the email activity data.

17. The system according to claim 16, wherein the data associated with the user's previous activity with the other emails includes data regarding the user's time of interaction with the other emails, the user's amount of scrolls through the other emails, or the user's interaction with links within the other emails.

* * * * *